US012139922B2

(12) United States Patent
Lee

(10) Patent No.: US 12,139,922 B2
(45) Date of Patent: Nov. 12, 2024

(54) ANTENNA TOWER CONSTRUCTION/DECONSTRUCTION STABILITY ASSEMBLIES AND METHODS

(71) Applicant: Robert C. Lee, Ephrata, WA (US)

(72) Inventor: Robert C. Lee, Ephrata, WA (US)

( * ) Notice: Subject to any disclaimer, the term of this patent is extended or adjusted under 35 U.S.C. 154(b) by 0 days.

(21) Appl. No.: 18/125,670

(22) Filed: Mar. 23, 2023

(65) Prior Publication Data

US 2023/0228116 A1 Jul. 20, 2023

Related U.S. Application Data

(63) Continuation of application No. 17/389,106, filed on Jul. 29, 2021, now Pat. No. 11,613,905.

(60) Provisional application No. 63/058,352, filed on Jul. 29, 2020.

(51) Int. Cl.

| | |
|---|---|
| ***E04H 12/34*** | (2006.01) |
| ***B66D 1/30*** | (2006.01) |
| ***B66D 1/60*** | (2006.01) |
| ***E04H 12/18*** | (2006.01) |
| ***E04H 12/20*** | (2006.01) |
| ***H01Q 1/12*** | (2006.01) |

(52) U.S. Cl.

CPC ............ *E04H 12/345* (2013.01); *B66D 1/30* (2013.01); *B66D 1/60* (2013.01); *E04H 12/187* (2013.01); *E04H 12/20* (2013.01); *H01Q 1/1235* (2013.01); *B66D 2700/0183* (2013.01)

(58) Field of Classification Search

CPC ..... E04H 12/345; E04H 12/34; E04H 12/187; E04H 12/20; H01Q 1/1235; H01Q 1/084; H01Q 1/1242; B66D 1/30; B66D 1/60; B66D 2700/0183

USPC .................................... 52/116, 745.17, 123.1

See application file for complete search history.

(56) References Cited

U.S. PATENT DOCUMENTS 2,474,250 A 6/1949 Howard
2,985,261 A 5/1961 Kubesh
3,033,527 A * 5/1962 Hart ........................ E21B 15/00 52/645
3,045,973 A * 7/1962 Slagle ...................... B66D 3/02 254/285
3,302,345 A 2/1967 Ballantine
3,388,810 A 6/1968 Durand
3,463,454 A 8/1969 Martin
(Continued)

FOREIGN PATENT DOCUMENTS

AU 2008270437 1/2009
AU 2020200125 1/2020
(Continued)

*Primary Examiner* — Brent W Herring

(74) *Attorney, Agent, or Firm* — Wells St. John P.S.

(57) ABSTRACT

Antenna tower construction/deconstruction biasing assemblies are provided. The biasing assemblies can be configured to extend between a standard and an antenna tower. The assemblies can include: an adjustable linear extension extending between a first end configured to couple with the standard and a second end configured to couple with the antenna tower; and a biasing mechanism configured to adjust the length of the linear extension and maintain the rigid engagement during transitioning of the tower from a down/erect position to an erect/down position. Methods for constructing/deconstructing an antenna tower are provided. The methods can include providing a biasing assembly.

12 Claims, 8 Drawing Sheets

(56) References Cited

U.S. PATENT DOCUMENTS

| | | | | | |
|---|---|---|---|---|---|
| 3,977,139 | A * | 8/1976 | Bryant | E04H 12/34 | 52/697 |
| 4,212,015 | A | 7/1980 | Graf et al. | | |
| 4,598,509 | A | 7/1986 | Woolslayer et al. | | |
| 4,903,442 | A * | 2/1990 | Trommen | E04H 12/187 | 174/45 R |
| 5,537,125 | A | 7/1996 | Harrell, Jr. et al. | | |
| 6,408,575 | B1 | 6/2002 | Yoshida et al. | | |
| 7,462,117 | B2 * | 12/2008 | White | A63B 63/083 | 473/481 |
| 7,621,077 | B1 * | 11/2009 | Perina | E02D 27/42 | 52/119 |
| 11,021,888 | B1 | 6/2021 | Smith | | |
| 11,165,134 | B1 | 11/2021 | Kingman | | |
| 11,746,553 | B1 * | 9/2023 | Donner | E04H 12/345 | 52/115 |
| 2002/0095878 | A1 | 7/2002 | Henderson | | |
| 2007/0175134 | A1 | 8/2007 | Christenson | | |
| 2019/0177995 | A1 | 6/2019 | Klause | | |
| 2020/0048965 | A1 | 2/2020 | Chen et al. | | |

FOREIGN PATENT DOCUMENTS

| | | | | |
|---|---|---|---|---|
| EP | 0379335 | | 7/1990 | |
| EP | 2031155 | | 3/2012 | |
| FR | 3031129 | | 7/2016 | |
| GB | 2205392 | | 12/1988 | |
| GB | 2425296 | A * | 10/2006 | E04H 17/263 |
| GB | 2472103 | | 1/2011 | |

* cited by examiner

ANTENNA TOWER CONSTRUCTION/DECONSTRUCTION STABILITY ASSEMBLIES AND METHODS

CROSS REFERENCE TO RELATED APPLICATION

This application is a Continuation of U.S. patent application Ser. No. 17/389,106 filed Jul. 29, 2021, entitled "Antenna Tower Construction/Deconstruction Stability Assemblies and Methods", which claims priority to and the benefit of U.S. Provisional Patent Application Ser. No. 63/058,352 filed Jul. 29, 2020, entitled "Tower Construction/Deconstruction Stability Assemblies and Methods", the entirety of each of which is incorporated by reference herein.

TECHNICAL FIELD

The field of the invention is in the area of antenna towers, and particularly, embodiments of the present disclosure relate to the construction and deconstruction of antenna towers.

BACKGROUND

More and more individuals are using antenna towers for personal use, and they continue to be used in industrial settings. Typically, these towers are constructed by placing a base of an antenna tower and pivotably attaching the antenna tower to a fixed structure or standard, and then raising the antenna tower about the pivot with a line such as a cable or chain support or construction assembly. The construction of the antenna towers by these methods can be quite dangerous, as in the construction phase the antenna tower as it reaches the peak of its construction phase can be unstable. Likewise, as the antenna tower is lowered during deconstruction, substantial instability can result as well. This instability can result in damage to the tower and grave risk to personal safety to those constructing the tower. The present disclosure provides antenna tower construction and deconstruction assemblies that can be utilized to lower the risk to individuals raising the towers and/or to the towers themselves.

SUMMARY

Methods for constructing/deconstructing an antenna tower are provided. The methods can include: providing a standard proximate an antenna tower base; raising or lowering at least a portion of an antenna tower using a line attached to the standard, the raising or lowering moving the antenna tower about a coupling to the tower base; and engaging a stability assembly between the standard and the tower to maintain tension in the line.

Antenna tower construction/deconstruction stability assemblies are provided. The assemblies can include: an antenna tower base; at least a portion of an antenna tower rotationally coupled to the base, the rotational coupling configured to transition the tower from a down/erect position to an erect/down position; a winch assembly located operably to the portion of the antenna tower; a standard supporting the winch assembly, wherein the winch assembly is configured to retrieve or disperse line coupled to the portion of the antenna assembly; and a stability assembly extending from the standard and configured to rigidly engage the portion of the antenna tower, the stability assembly being operable to maintain the rigid engagement during transitioning of the tower from a down/erect position to an erect/down position.

Antenna tower construction/deconstruction biasing assemblies are provided. The biasing assemblies can be configured to extend between a standard and an antenna tower. The assemblies can include: an adjustable linear extension extending between a first end configured to couple with the standard and a second end configured to couple with the antenna tower; and a biasing mechanism configured to adjust the length of the linear extension and maintain the rigid engagement during transitioning of the tower from a down/erect position to an erect/down position.

Methods for constructing/deconstructing an antenna tower are provided. The methods can include providing a biasing assembly. The biasing assembly can include: an adjustable linear extension extending between a first end configured to couple with the standard and a second end configured to couple with the antenna tower; and a biasing mechanism configured to adjust the length of the linear extension and maintain the rigid engagement during transitioning of the tower from a down/erect position to an erect/down position standard proximate an antenna tower base.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1A:
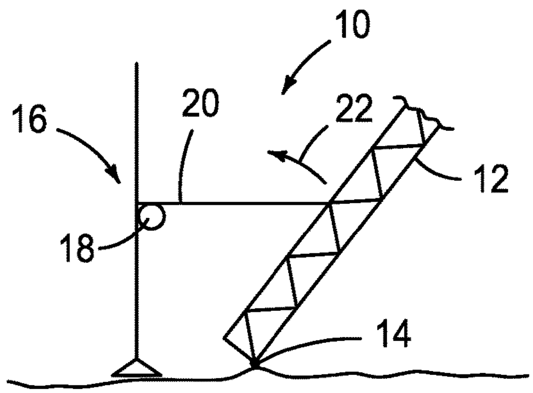
FIGS. 1A-1D depict a series of both antenna tower construction and deconstruction stages according to illustrate problems associated with stages.
Figure 1B:
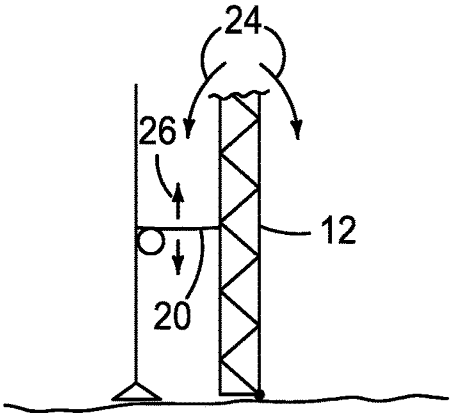

The present disclosure will be described with reference to FIGS. 1A-7. Referring first to FIG. 1A, an antenna tower construction stage 10 is shown with antenna tower 12 rotationally coupled (pivotably attached) to antenna tower base (ground structure) 14 and being raised to position 22 via line (cable or chain) 20 attached to a winch assembly 18 and standard (fixed assembly) 16. In accordance with example implementations and with reference to FIG. 1B, tower 12 can be raised into place (erect position), and as it is raised into place, the momentum of the tower reaching its peak position can cause instability 24 and 26 at line 20 and tower 12. Accordingly, this instability can damage the tower and may in fact snap the line and result in the tower returning to its deconstructed (down) state, thereby potentially injuring those about the tower.

Figure 1C:
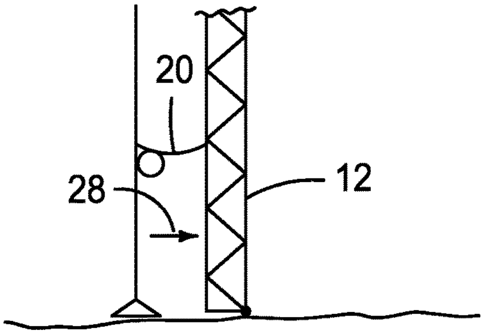
Figure 1D:
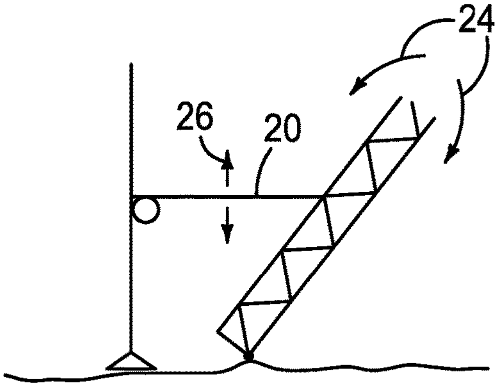

Referring next to FIG. 1C, during deconstruction (lowering), similar instability can occur, in that line 20 can be in a slack position, and tower 12 can be forced to a line non-slack position 26. Line 20 non-slack position is shown in FIG. 1D. This non-slack position can result in instability 26 and 24, again risking danger to the antenna tower and the operators or contractors associated therewith.

Figure 2A:
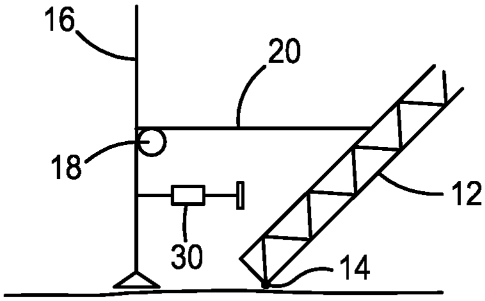
FIGS. 2A-2C depict a series of antenna tower construction stages according to an embodiment of the disclosure.
Figure 2B:
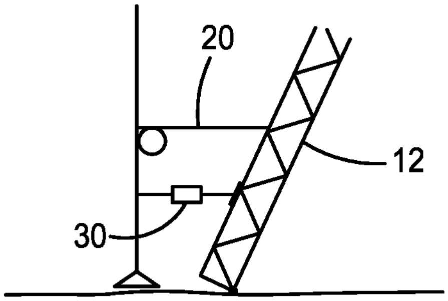
Figure 2C:
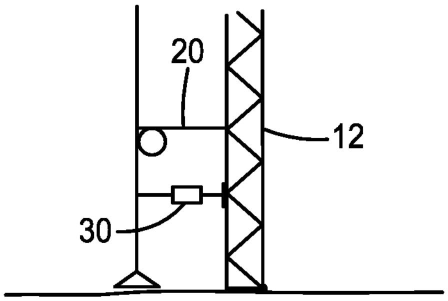

Referring next to FIGS. 2A-2C, in accordance with example implementations, stability assembly 30 is provided and can be utilized when raising tower 12 about pivot point 14 utilizing line 20. Pivot point 14 can be the rotational coupling of the tower to the antenna tower base. In accordance with at least one example implementation, this coupling can be a hinge. As tower 12 is raised into place (erect position), tension on line 20 is maintained by having stability assembly 30 engage at least a portion of tower 12 and put resistance against tower 12 as it is raised into place, thereby as winch 18 is retrieving line 20, tension on stability assembly 30 is reduced, allowing tower 12 to gain the erect position without instability 26 or 24. As shown, stability assembly 30 is engaged with standard 18 in a rather normal dimensional relationship, however angled relationships other than normal are also contemplated.

Figure 3A:
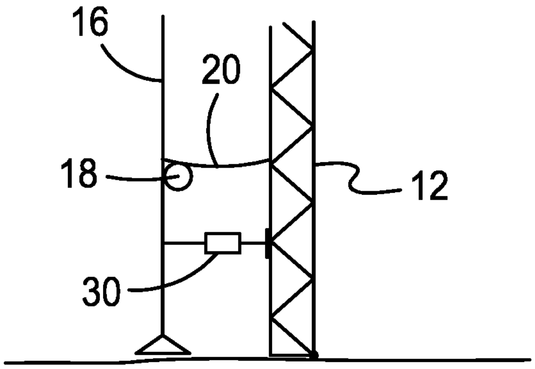
FIGS. 3A-3B depict a series of antenna tower deconstruction stages according to an embodiment of the disclosure.
Figure 3B:
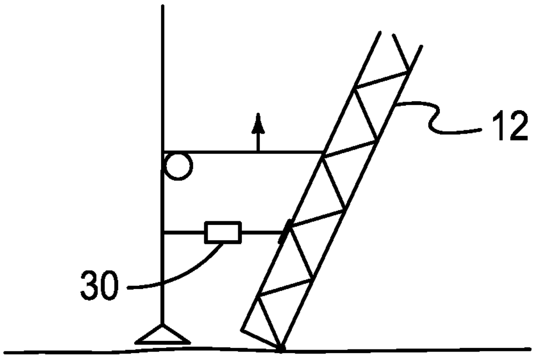

Referring next to FIGS. 3A-3B, stability assembly 30 can be utilized to place tension on line 20, allowing line 20 to be un-winched from standard 16, and allowing tower 12 to be lowered to the deconstructed position without the instability shown in FIGS. 1C-1D. In accordance with example implementations, assembly 30 can engage at least a portion of tower 12 when tower 12 is in the erect position and while line 20 is extended, the stability assembly can be extended to maintain tension in line 20 while moving tower 12 to a teetering position. Upon sufficient line being extended to allow the tower to maintain tension in the line, the stability assembly can be disengaged from the tower.

Figure 4:
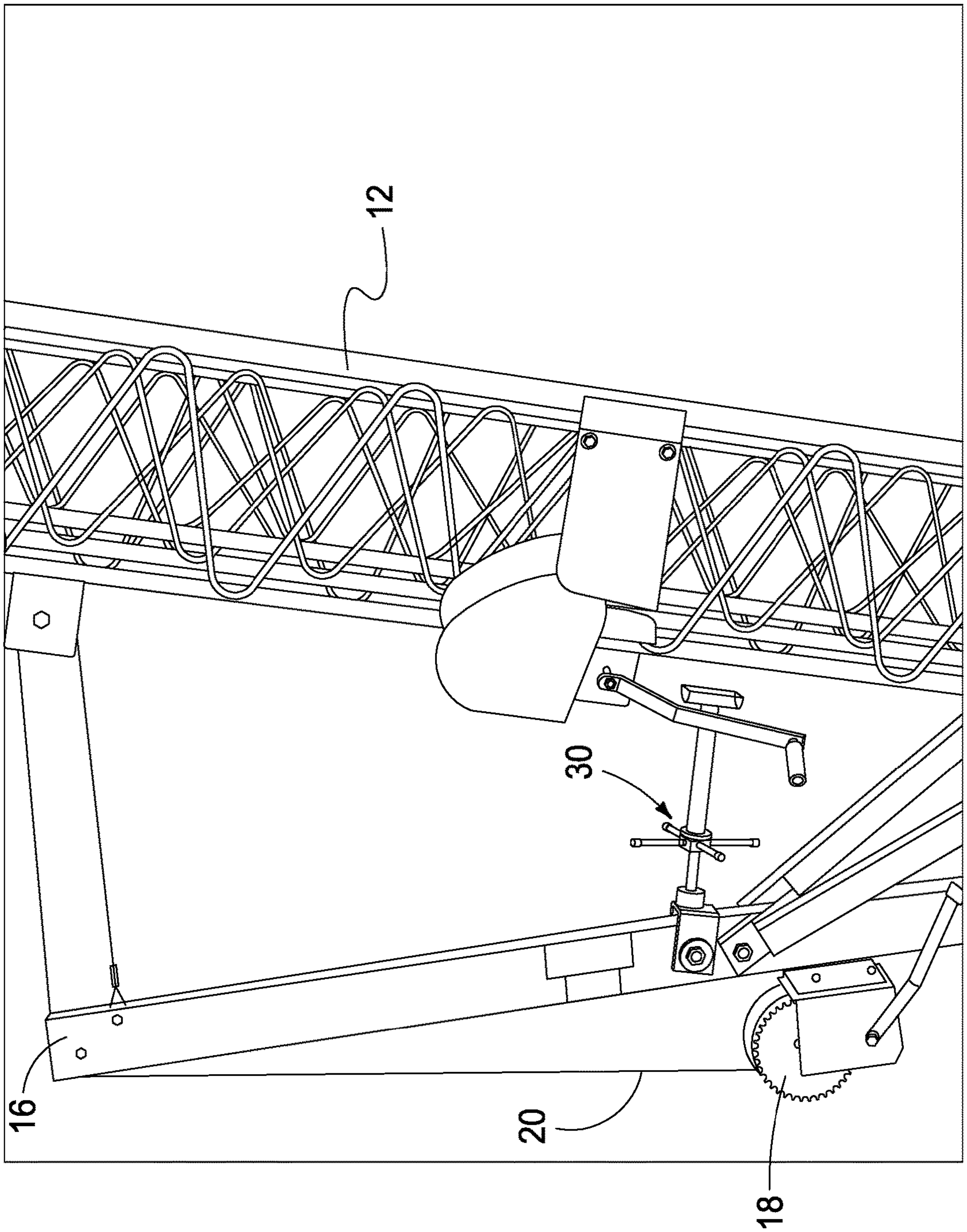
FIG. 4 is a depiction of an antenna tower construction stage according to an embodiment of the disclosure.

Referring next to FIG. 4, in at least one stage, an example stability assembly 30 is shown disengaged from tower 12 while line 20 is directing tower 12 to the erect position.

Figure 5:
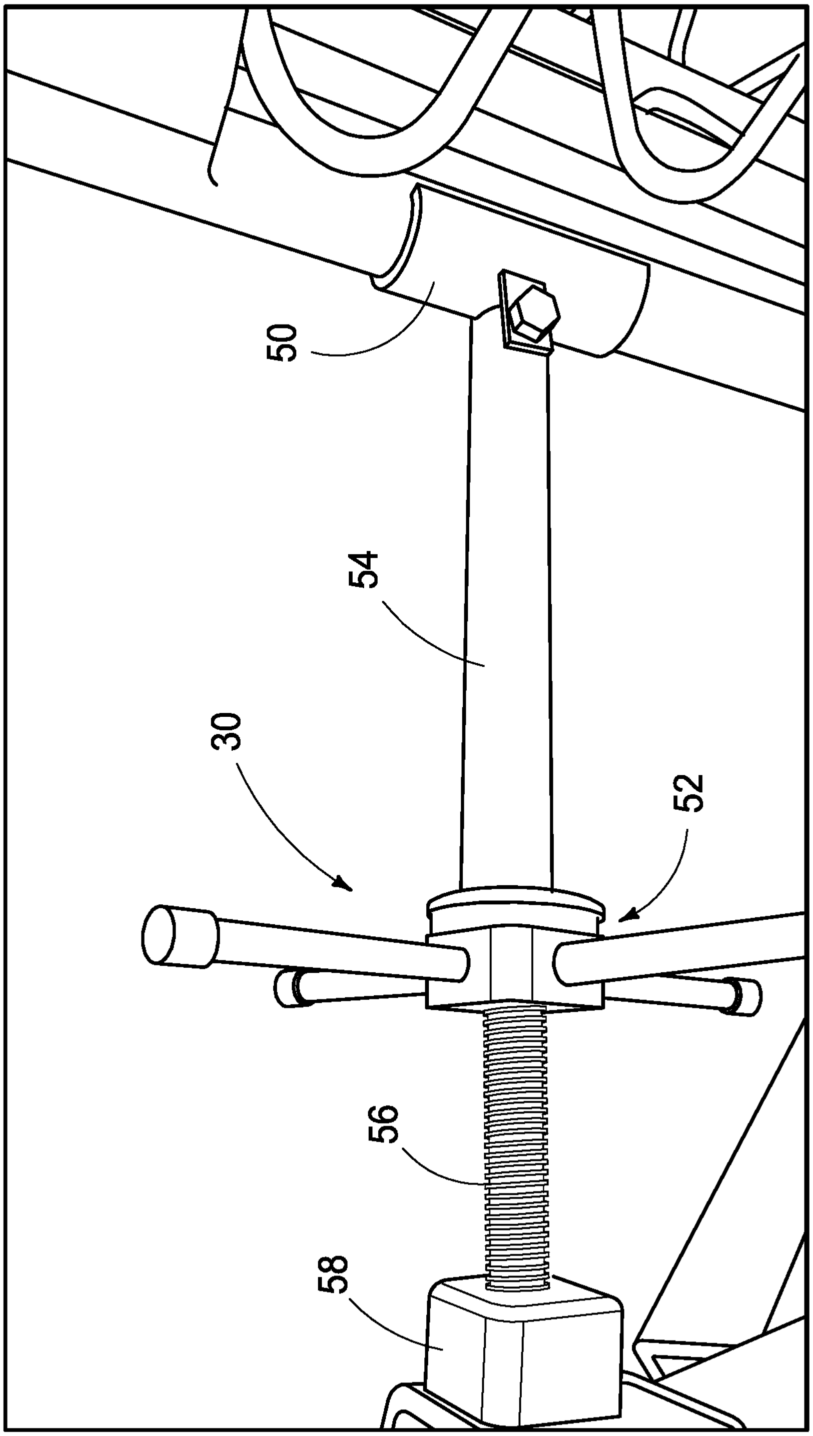
FIG. 5 is a depiction of the antenna tower stability assembly according to an embodiment of the disclosure.
Figure 8:
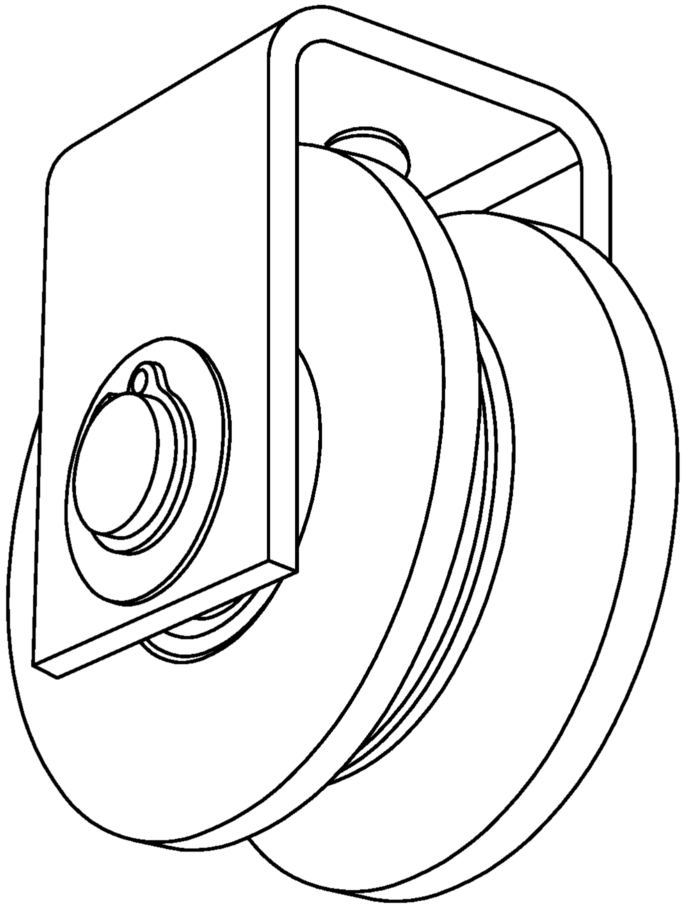
FIG. 8 is an example component of a stability assembly according to an embodiment of the disclosure.

Referring next to FIG. 5, stability assembly 30 is shown engaged with tower 12 and coupling component 50 and component 54 operably engaged to bias with component 56 about biasing assembly 52. Coupling component 50 can be constructed of a complimentary configuration to mate with but slidably engage the portion of tower 12. In the shown embodiment, this coupling is a half section of a tube that is sufficiently large to engage a tube portion of tower 12. Other configurations are contemplated include square or rotating configurations such as those shown in FIG. 8 below.

In accordance with example implementations, component 54 can be a tube, to received complimentary threaded bolt 56, and assembly 52 can be operational to engage the threading of bolt 56 to within tube 54 as component assembly 58 engages standard 16, according to example implementations. Inside component assembly 58 can be a nut welded to bolt 56 to affix it from turning. The nut inside assembly 52 screws in and/or out to extend or retract the tube 54 in and/or out. Tube 54 can float in and/or out as bolt 56 is long enough to stop when the cable 20 is at the right tension to take over and not run out of thread.

Figure 6:
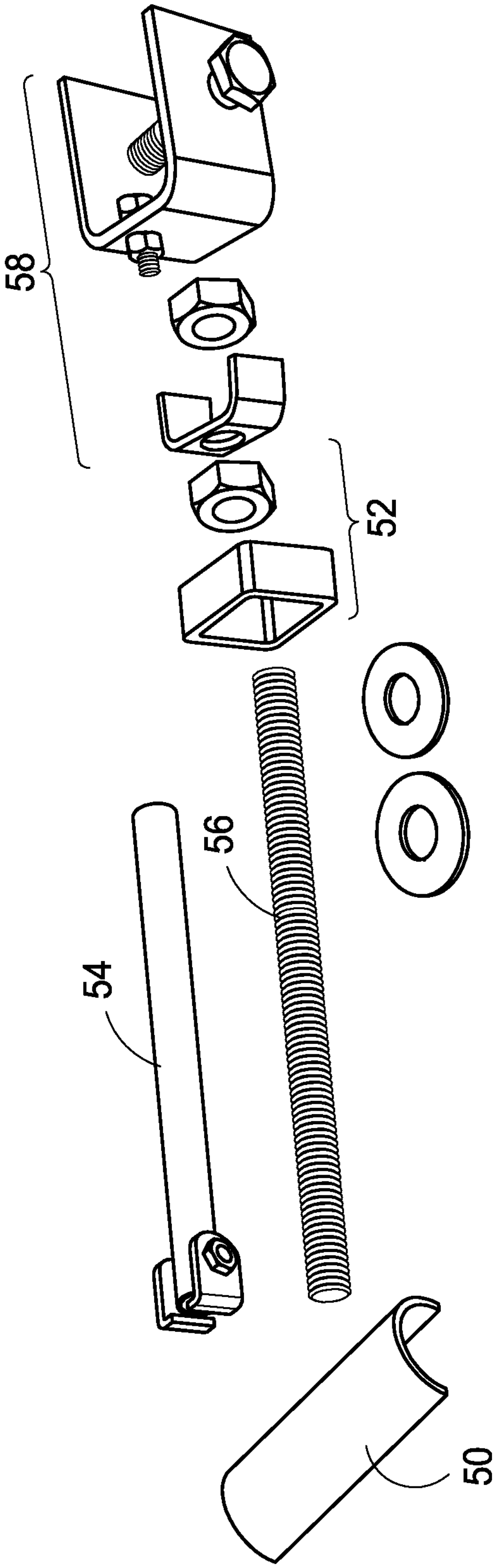
FIG. 6 depicts components of the antenna tower stability assembly according to an embodiment of the disclosure.

Referring next to FIG. 6, component assembly 58 is shown in more detail as a block and cinch assembly, as well as coupling component 50 and internal conduit 54 as well as threaded bolt 56.

Figure 7:
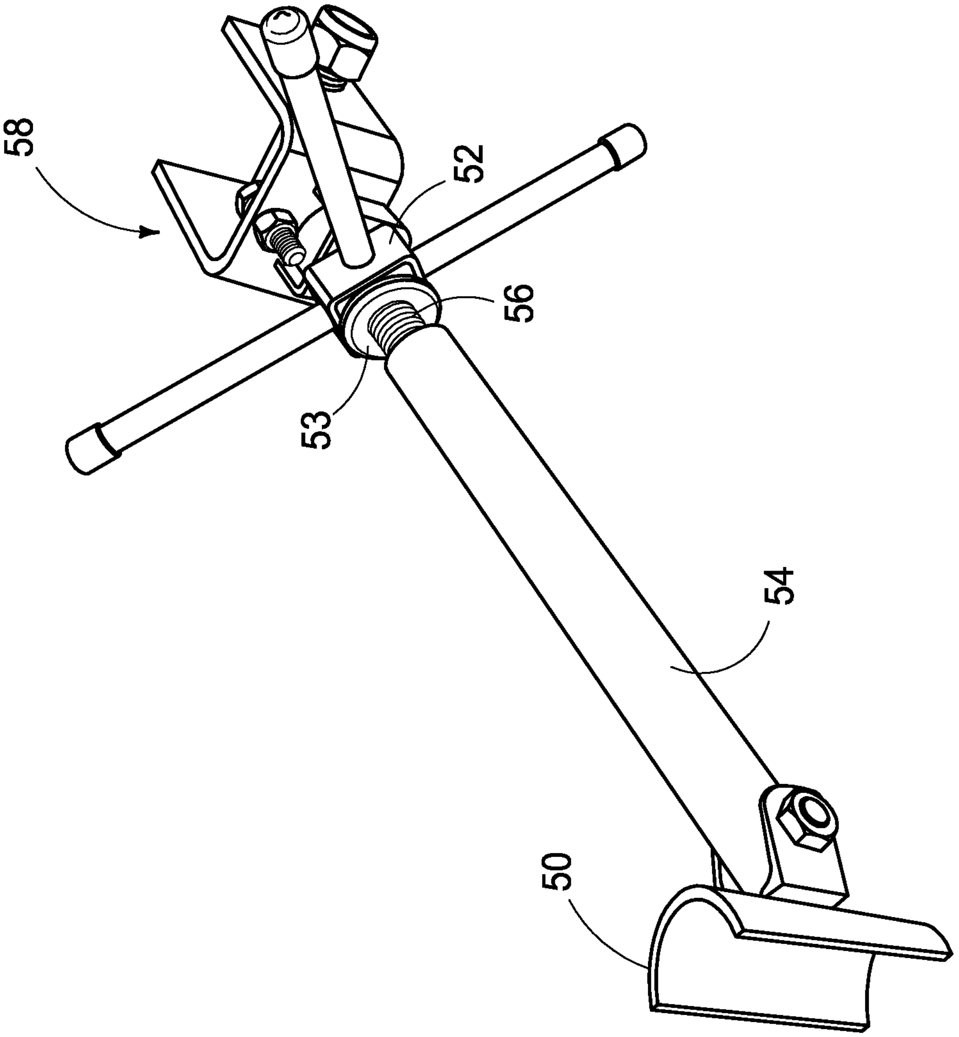
FIG. 7 is a constructed antenna tower stability assembly according to an embodiment of the disclosure.

Referring next to FIG. 7, stability assembly 30 is shown assembled having component assembly 58 configured for coupling to a standard, adjustable biasing assembly 52 as well as bolt 56, conduit 54, and coupling component 50. Additionally, bushing 53 can be provided. As mentioned previously, FIG. 8 provides another example of a coupling component 50 which is configured to rotate as the tower is raised or lowered into position.

In accordance with example implementations, and with reference to the above assemblies, tower assemblies can be raised and lowered into position relatively safely and with little damage to the tower and/or those constructing or deconstructing the tower. In accordance with example implementations, various towers can be constructed/deconstructed using these assemblies and/or methods. For example, 52 ft towers typically having three sections, 72 ft towers typically having four sections, and/or 89 ft towers typically having five sections can be constructed.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. An antenna tower construction/deconstruction biasing assembly for use when raising a pivotably attached antenna tower into position using a winch/cable assembly operably coupled to a separate standard, the biasing assembly configured to extend between the separate standard and the antenna tower, the assembly comprising:

an adjustable linear extension extending between a first end configured to couple with the standard and a second end configured to couple with the antenna tower, wherein the first end is pivotably fixed to the standard and the second end is configured to slidably engage a portion of the antenna tower; and a biasing mechanism configured to adjust the length of the linear extension and maintain a rigid engagement during transitioning of the tower from a down/erect position to an erect/down position, the rigid engagement keeping tension on the winch/cable assembly.

2. The assembly of claim 1 wherein the biasing assembly comprises a shaft and tube assembly.

3. The assembly of claim 2 wherein the shaft is threaded.

4. The assembly of claim 3 wherein the biasing assembly further comprises a nut complimentarily threaded and of sufficient size to fix the tube in relation to the shaft.

5. The assembly of claim 3 wherein the tube is complimentarily threaded to the shaft and configured to extend or retreat when operated upon the threads.

6. The assembly of claim 5 wherein the tube is pivotably attached to a coupling configured to engage at least some portion of the antenna tower.

7. A method for constructing/deconstructing an antenna tower using a standard and a cable/winch assembly to raise/lower the antenna tower, the method comprising:

providing a biasing assembly comprising an adjustable linear extension extending between a first end configured to couple with the standard and a second end configured to couple with the antenna tower, wherein the first end is pivotably fixed to the standard and the second end is configured to slidably engage a portion of the antenna tower, the standard being aligned lateral of the antenna tower; and adjusting the length of the linear extension to maintain the rigid engagement during transitioning of the tower from a down/erect position to an erect/down position, the rigid engagement keeping tension on the winch/cable assembly.

8. The method of claim 7 wherein the biasing assembly comprises a shaft and tube assembly.

9. The method of claim 8 wherein the shaft is threaded.

10. The method of claim 9 wherein the biasing assembly further comprises a nut complimentarily threaded and of sufficient size to fix the tube in relation to the shaft.

11. The method of claim 9 wherein the tube is complimentarily threaded to the shaft and configured to extend or retreat when operated upon the threads.

12. The method of claim 11 wherein the tube is pivotably attached a coupling configured to engage at least some portion of the antenna tower.

* * * * *